(12) United States Patent
Taylor et al.

(10) Patent No.: US 7,163,452 B1
(45) Date of Patent: Jan. 16, 2007

(54) SQUIRREL SKINNING DEVICE AND METHOD THEREOF

(76) Inventors: Sean Taylor, 240 10th, Manistee, MI (US) 49660; Alan Lott, 4650 Jackpine Dr, Brethren, MI (US) 49619; Gary Petersen, 5000 S US 31, Ludington, MI (US) 49431

( * ) Notice: Subject to any disclaimer, the term of this patent is extended or adjusted under 35 U.S.C. 154(b) by 0 days.

(21) Appl. No.: 11/162,093

(22) Filed: Aug. 29, 2005

(51) Int. Cl.
*A22C 17/00* (2006.01)
(52) U.S. Cl. ............................................. 452/103
(58) Field of Classification Search .............. 452/1–6, 452/102–105, 125, 128, 132; 81/3.4, 3.41, 81/3.42, 3.44, 3.55, 3.47, 3.56, 3.57, 9.4, 81/9.41, 9.42, 315, 316, 318, 319–321, 489, 81/491
See application file for complete search history.

(56) References Cited

U.S. PATENT DOCUMENTS 4,438,546 A * 3/1984 Couture ...................... 452/128
4,506,411 A    3/1985 Ivy ............................. 17/44.3
4,625,363 A   12/1986 Watson ....................... 17/44.2
4,710,998 A * 12/1987 Gast ........................... 452/128
4,782,557 A   11/1988 Gladney et al. ............. 17/44.2
5,031,485 A *  7/1991 Wu ............................. 81/3.44
5,685,770 A * 11/1997 Wood, Sr. ................... 452/125
5,782,684 A *  7/1998 Shaff .......................... 452/128
6,015,339 A    1/2000 Lochbrunner et al. ...... 452/187
6,042,469 A *  3/2000 Wagner ....................... 452/185
6,296,559 B1 * 10/2001 Kinnebrew ................. 452/128

* cited by examiner

*Primary Examiner*—Thomas Price
(74) *Attorney, Agent, or Firm*—Patwrite LLC; Mark David Torche

(57) ABSTRACT

A squirrel skinning device and method that makes skinning and cleaning a squirrel easy and safe. The squirrel skinning device consists of two handle sections that pivot like scissors to force jaws together to hold a squirrel by the tail bone to allow easy removal of the skin and to prepare the meat for use. A user stands on a base portion with one foot and another smaller base section that is positioned above the lower base with the other foot. The user's weight provides the torque that securely holds the squirrel in the jaws while pulling upward to skin the squirrel.

9 Claims, 3 Drawing Sheets

SQUIRREL SKINNING DEVICE AND METHOD THEREOF

BACKGROUND OF THE INVENTION

Hunting is an ancient art that at one time meant survival. Today, most hunting is recreational, but many hunters still eat the animals that they hunt. Before most animals can be eaten, they must be skinned and squirrels are extremely difficult to skin. In the past, squirrels have proved difficult to skin and this has led to a decline in the number of people who still hunt and eat squirrels.

In the past, squirrels were often cleaned by splitting the skin across its back and then pulling the two pieces in opposite direction. This is difficult and gets a lot of fur on the meat. Another method often used in the past is placing a foot on the squirrel's tail and pulling on the hind legs. This method is better, but the tail often slips or is pulled out altogether. This method also has problems with fur.

SUMMARY OF THE INVENTION

A method of skinning squirrels is needed that makes it easy and quick to allow hunters to enjoy cleaning and preparing squirrel meat for cooking. A device is needed that allows the user to securely hold the squirrel while cleaning that makes removal of the skin and fur easy and affordable.

It is therefore an object of the present invention to provide a squirrel skinning device that is easy to use and which securely grips a squirrel for skinning without slipping.

It is a further object of the present invention to provide a method of skinning a squirrel using the squirrel skinning device to provide a fast and easy method of skinning that does not leave fur on the meat and is cleaner and more sanitary to use.

Other features and advantages of the instant invention will become apparent from the following description of the invention which refers to the accompanying drawings.

DETAILED DESCRIPTION OF THE INVENTION

Figure 1:
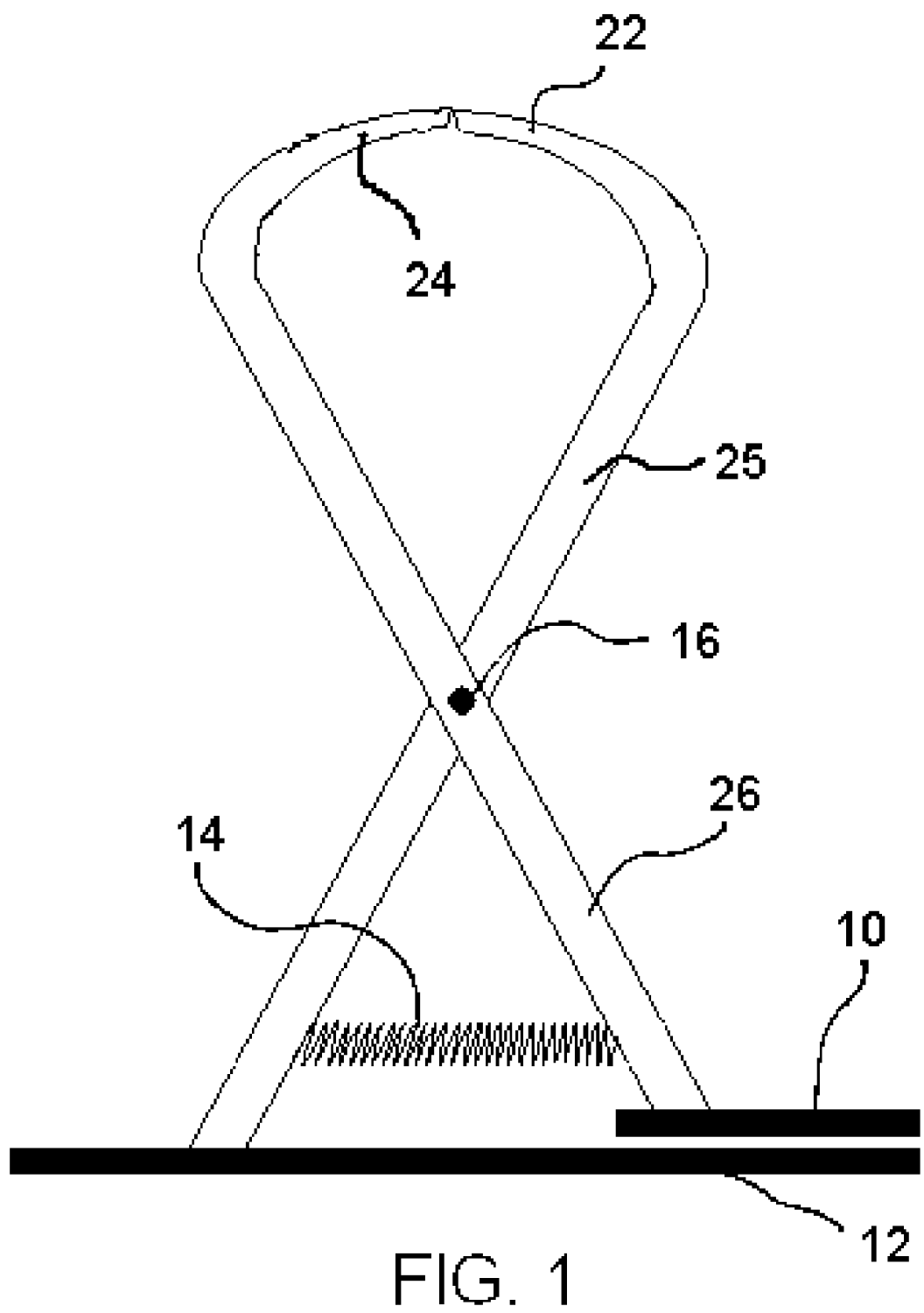
FIG. 1 is front view of an embodiment of the present invention.
2.
Figure 3:
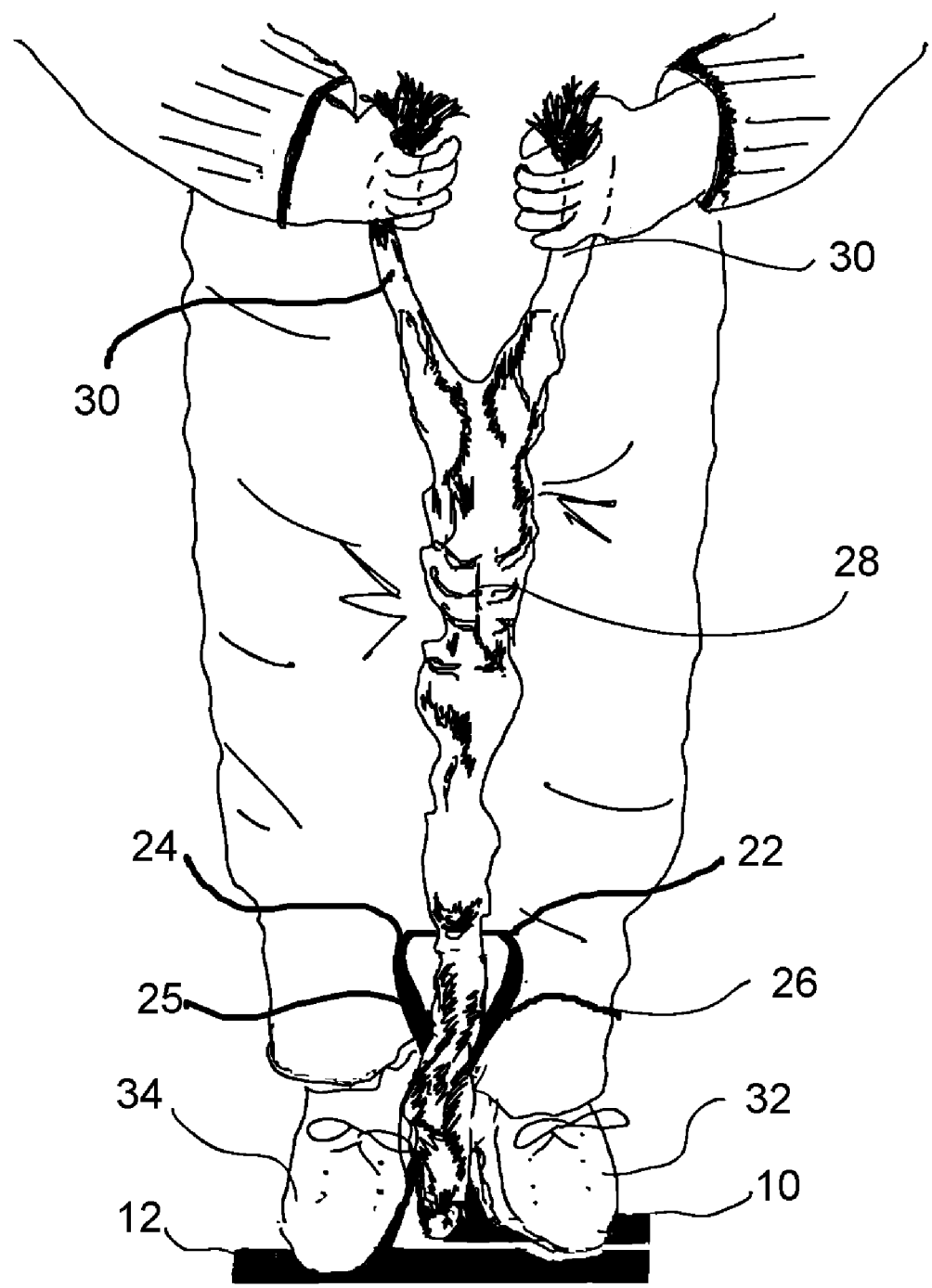
FIG. 3 is a drawing of an embodiment of the present invention in use.

Referring to FIG. 1, a squirrel skinning device is shown having a first gripping portion 22 and a second gripping portion 24 that oppose each other in use. The gripping portions 22 and 24 respectively may be knurled, cross-hatched, chisel-edged or otherwise made to provide maximum gripping power as is known in the art. A first and second handle section 25 and 26 respectively are joined to gripping portions 22 and 24 and are preferably of the same material as handle sections 25 and 26. A steel band stock material may be used to integrally form both handle and gripping portion and may be twisted to provide a flatter gripping portion 22 and 24 as is known in the art. A pivot pin 16 is provided to allow first and second handle sections to rotate about the pivot pin 16 to provide the torque necessary to maintain a secure hold on the squirrel. Pivot pin 16 may be a rivet or a bolt or any other means to provide a pivoting point for the two handles to rotate about each other. First handle section 25 is welded to a first base portion 12 that extends along the whole base length of the present invention to provide a stable and secure area for a user to place his or her foot (FIG. 3). Second handle section 26 is welded to a smaller second base portion 10 that lies above and in a parallel plane to first base portion 12. Although the present invention uses a weld to join the handle sections to the base portions, other methods of joining would be acceptable as is known in the art including but not limited to making the entire first gripping, handle and base of a single material such as steel or aluminum or by rivets or bolts etc. as long as the unit can successfully transmit the required torque to gripping portions 22 and 24 to secure the squirrel. A spring 14 is provided between first handle section 25 and second handle section 26 to bias the unit in a normally closed position to help the user hold the squirrel in place.

Figure 2:
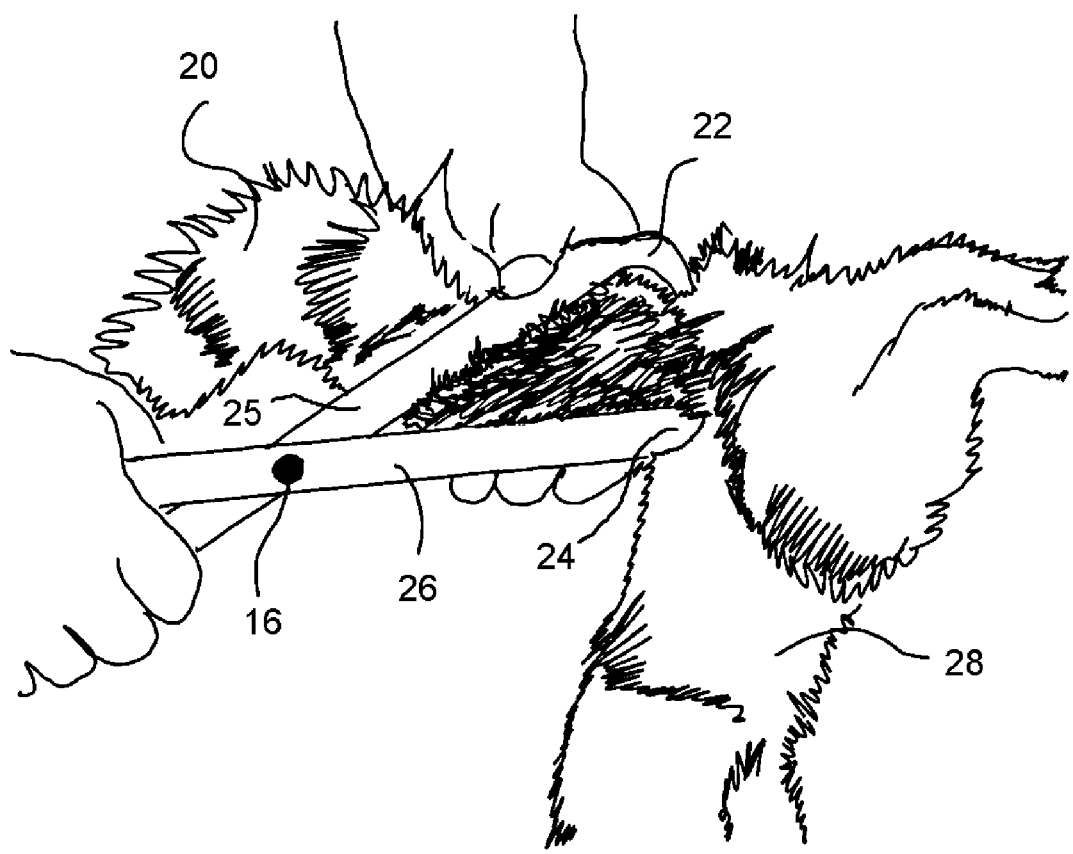
FIG. 2 is a drawing of an embodiment of the present invention gripping a squirrel tail.
3.

Now referring to FIGS. 2 and 3, the squirrel skinning device is shown in use by first applying sufficient pressure to a lower portion of handles 25 and 26 to open jaws 22 and 24 wide enough to place the tail of a squirrel 20 between them. The squirrel is now temporarily held in place and the unit is placed on the floor. The user places his or her right foot 34 on first base portion 12 to stabilize the unit. The user then places his or her left foot 32 on the second base portion 10. The second base portion 10 is positioned above first base portion 12 and defines a gap between the two base portions 10 and 12. As the user steps on second base portion 10, it is forced down towards first base portion 12 by the weight of the user closing the gap between the two base portions 10 and 12. This forces the two handles 25 and 26 to rotate around pivot pin 16 and applies sufficient pressure to jaws 22 and 24 to securely hold the squirrel by the tail bone. In practice, a small cut can be made at the base of the squirrel's tail on the bottom side leaving the top skin intact to help separate the skin from the carcass. The user then pulls upward on the back legs 30 of the squirrel which easily separates the front skin from the front portion of the squirrel. The user then pulls on a v-shaped belly skin (on the back portion) and while still standing on the unit, pulling upward separating the rest of the skin from the carcass 28. In this way, both the front and back portions of the squirrel are cleaned.

Although the instant invention has been described in relation to particular embodiments thereof, many other variations and modifications and other uses will become apparent to those skilled in the art

What is claimed is:

1. A skinning device comprising:
   a first gripping portion;
   a second gripping portion opposably disposed to said first gripping portion;
   a first handle section having said first gripping portion distally disposed on an end thereof;
   said first handle section having a first base portion on an other end thereof, wherein a user stands on said first base portion to stabilize said skinning device;
   a second handle section having said second gripping portion distally disposed on an end thereof and pivotally connected to said first handle section; and
   said second handle section having a second base portion on an other end thereof, wherein said second base portion is collinearly disposed with said first base portion and defining a planar gap disposed between said base portions, wherein when said user places a foot on said second base portion, said first gripping portion is forced towards said second gripping portion.

2. A skinning device according to claim 1 further comprising a spring biasingly connecting said first and second handle section wherein said first and second gripping portions are forcibly biased towards each other.

3. A skinning device according to claim 2 wherein said first and second gripping portions have a cross-hatched gripping surface.

4. A skinning device according to claim 2 wherein said first and second gripping portions have a chisel shaped gripping surface.

5. A skinning device according to claim 2 wherein said first and second gripping portions have a plurality of teeth-like projections.

6. A method of skinning a squirrel comprising the steps of:
using a skinning device comprising:
   a first gripping portion;
   a second gripping portion opposably disposed to said first gripping portion;
   a first handle section having said first gripping portion distally disposed on an end thereof;
   said first handle section having a first base portion on an other end thereof, wherein a user stands on said first base portion to stabilize said skinning device;
   a second handle section having said second gripping portion distally disposed on an end thereof and pivotally connected to said first handle section;
   said second handle section having a second base portion on an other end thereof, wherein said second base portion is collinearly disposed with said first base portion and defining a planar gap disposed between said base portions, wherein when said user places a foot on said second base portion said first gripping portion is forced towards said second gripping portion;
opening said skinning device by applying a sufficient force to move said first and second gripping portions away from each other;
inserting a tail of a squirrel between said first and second gripping portions;
standing on said first and second base portions thereby applying pressure on said tail of said squirrel;
holding said squirrel by the back legs of said squirrel;
pulling on the back legs of said squirrel whereby a front skin portion of said squirrel pulls off;
grabbing an opposite side skin portion and pulling upward while maintaining pressure on said first and second base portions; and
skinning a remainder of said squirrel.

7. A method of skinning a squirrel according to claim 6 further comprising a spring biasingly connecting said first and second handle section wherein said first and second gripping portions are forcibly biased towards each other.

8. A method of skinning a squirrel according to claim 7 wherein said first and second gripping portions have a cross-hatched gripping surface.

9. A method of skinning a squirrel according to claim 7 further comprising the step of making a small cut on a lower side of said squirrel around the base of said tail.

* * * * *